(12) United States Patent
Li

(10) Patent No.: US 7,792,339 B2
(45) Date of Patent: Sep. 7, 2010

(54) METHOD AND APPARATUS FOR INTRACEREBRAL HEMORRHAGE LESION SEGMENTATION

(75) Inventor: Wu Li, Beijing (CN)

(73) Assignee: GE Medical Systems Global Technology Company, LLC

( * ) Notice: Subject to any disclaimer, the term of this patent is extended or adjusted under 35 U.S.C. 154(b) by 1039 days.

(21) Appl. No.: 11/499,299

(22) Filed: Aug. 4, 2006

(65) Prior Publication Data
US 2007/0031020 A1   Feb. 8, 2007

(30) Foreign Application Priority Data
Aug. 5, 2005   (CN) .................. 2005 1 0091067

(51) Int. Cl.
*G06K 9/00* (2006.01)
*G06K 9/34* (2006.01)
*G06K 9/40* (2006.01)

(52) U.S. Cl. .................. 382/128; 382/131; 382/132; 382/173; 382/266

(58) Field of Classification Search ............... None
See application file for complete search history.

(56) References Cited

U.S. PATENT DOCUMENTS

| | | | |
|---|---|---|---|
| 5,204,625 | A | 4/1993 | Cline et al. |
| 5,452,367 | A | 9/1995 | Bick et al. |
| 5,825,909 | A * | 10/1998 | Jang .................. 382/132 |
| 5,881,124 | A | 3/1999 | Giger et al. |
| 5,903,664 | A | 5/1999 | Hartley et al. |
| 5,984,870 | A | 11/1999 | Giger et al. |
| 6,138,045 | A | 10/2000 | Kupinski et al. |
| 6,185,320 | B1 | 2/2001 | Bick et al. |
| 7,502,499 | B2 * | 3/2009 | Grady .................. 382/128 |

FOREIGN PATENT DOCUMENTS

JP   2005-118510   5/2005

OTHER PUBLICATIONS

Loncaric et al., "A method for segmentation of CT Head Images", Proceedings of the 9th International Conference on Image Analysis and Processing-vol. II, Lecture Notes in Computer Science; vol. 1311, 1997, pp. 388-395.*

Loncaric et al., "Quantitative intracerebral brain hemorrhage analysis", Proc. SPIE, vol. 3661, 886, 1999, pp. 1-9.*

Loncaric et al., "3-D image analysis of intra-cerebral brain hemorrhage from digitized CT films", Computer Methods and Programs in Biomedicine 46, 1995, pp. 207-216.*

(Continued)

*Primary Examiner*—Tom Y Lu
*Assistant Examiner*—Thomas A Conway
(74) *Attorney, Agent, or Firm*—Armstrong Teasdale LLP

(57) ABSTRACT

The present invention provides a method and apparatus for appropriately performing the intra-cerebral hemorrhage lesion segmentation by determining a higher scale level image by means of a scale space filtering on an X-ray CT image of a head with the onset of intra-cerebral hemorrhage, determining the region of interest which corresponds to a contour of brain based on the higher scale level image, performing an unsupervised classification on the image in the region of interest of the X-ray CT image of the head, and recognizing the intra-cerebral hemorrhage lesion by means of an expert system from the result of the unsupervised classification.

20 Claims, 10 Drawing Sheets

OTHER PUBLICATIONS

Jasjit et al., "Angiography and plaque imaging: advanced segmentation techniques", CRC Press LLC, 2003, pp. 70-73.*

Laine et al., "Mammographic feature enhancement by multiscale analysis", IEEE Trans. On Medical Imaging, 1994, vol. 13, issue 4, pp. 725-740.*

Mao Yuqing, et al., The Researching and Implementation of Morphological Recognition in the System of Diagnosing the Early Stage Lung Cancers; Computer Engineering, Aug. 1999; vol. 25 No. 8; pp. 21-23.

* cited by examiner

METHOD AND APPARATUS FOR INTRACEREBRAL HEMORRHAGE LESION SEGMENTATION

CROSS REFERENCE TO RELATED APPLICATIONS

This application claims the benefit of Chinese Application No. 200510091067.1 filed Aug. 5, 2005.

BACKGROUND OF THE INVENTION

The present invention is directed to a method and apparatus for intra-cerebral hemorrhage lesion segmentation, and more specifically to a method and apparatus for recognizing the intra-cerebral hemorrhage lesion on an X-ray CT image of a head in which intra-cerebral hemorrhage has been onset.

In order to diagnose and treat the intra-cerebral hemorrhage (ICH), the segmentation of intra-cerebral hemorrhage lesion is conducted on an X-ray CT image of the head. The segmentation may be artificially conducted by the intervention of a specialist (see for example patent reference 1).

[Patent reference 1] JP-A-2005-118510 pp 6-7, FIGS. 3-7

Artificial segmentation by the intervention of a specialist may take longer and labor, as well as the result of segmentation is depended on the skill of attending physician. When attempting to automate, the CT value of the intra-cerebral hemorrhage lesion may vary according to the symptom, there may be a case in which it overlaps with the CT value of other healthy part, so that the object cannot be achieved with the segmentation of only one single threshold.

SUMMARY OF THE INVENTION

The problem to be solved by the present invention, therefore, is to achieve a method and apparatus for appropriately conducting the intra-cerebral hemorrhage lesion segmentation.

First aspect of the present invention for solving the problem above cited provides a method of intra-cerebral hemorrhage lesion segmentation characterized by including the steps of: determining a higher scale level image by means of a scale space filtering on an X-ray CT image of a head with the onset of intra-cerebral hemorrhage; determining a region of interest which corresponds to a contour of brain based on the higher scale level image; performing an unsupervised classification on the image in the region of interest of the X-ray CT image of the head; and recognizing the intra-cerebral hemorrhage lesion by means of an expert system from the result of the unsupervised classification.

Second aspect of the present invention for solving the problem mentioned above provides an apparatus for intra-cerebral hemorrhage lesion segmentation characterized by including: a filtering means for determining a higher scale level image by means of a scale space filtering on an X-ray CT image of a head with the onset of intra-cerebral hemorrhage; a region of interest formation means for determining the region of interest that corresponds to a contour of brain based on the higher scale level image; a classification means for performing an unsupervised classification on the image in the region in question of the X-ray CT image of the head; and a recognition means for recognizing the intra-cerebral hemorrhage lesion by means of an expert system from the result of the unsupervised classification.

The scale space filtering is preferably performed by an anisotropic diffusion filtering, in order to achieve a good edge retaining.

The region of interest is preferably determined by a skull contour extraction for the higher scale level image, an unsupervised classification of the higher scale level image, a threshold segmentation of the result of the unsupervised classification, a skull image extraction from the result of the threshold segmentation, an elimination of the region corresponding to the skull image from the region surrounded by the skull contour, and a morphological operation on the remaining region in order to properly forming the region of interest.

The unsupervised classification is preferably performed by the adaptive initial threshold confirmation on the image within the region of interest of the higher scale level image, and the automatic classification of the image within the region of interest of the skull X-ray CT image based on the initial threshold determined by the adaptive initial threshold confirmation in order to properly conduct the classification.

The adaptive initial threshold confirmation is preferably performed by the determination on the result of the threshold segmentation based on a plurality of initial threshold candidates predefined in order to conduct optimization of an initial threshold.

The automatic classification is preferably performed by the computation of initial parameters by using the initial threshold determined by the adaptive initial threshold confirmation, and the automatic classification of the image within the region of interest of the skull X-ray CT image by using the initial parameters, in order to properly conduct the classification.

The automatic classification is preferably performed by the threshold segmentation in order to properly conduct the segmentation.

The automatic classification is preferably performed by the MAP segmentation in order to properly conduct the segmentation.

The automatic classification is preferably performed by the FCM clustering in order to properly conduct the segmentation.

The intra-cerebral hemorrhage lesion segmentation apparatus preferably has a user interface for enabling retrieve of images, display of images, display of information associated with the displayed image, selection of segmentation method, interactive manipulation of segmentation result, and the computation of intra-cerebral hemorrhage parameters, in order to achieve a good operability.

The user interface is preferably a graphical user interface in order to achieve a better operability.

In accordance with the aspects mentioned above of the present invention, a method and apparatus for properly conducting the intra-cerebral hemorrhage lesion segmentation may be achieved by: determining a higher scale level image by means of a scale space filtering on a skull X-ray CT image with the onset of intra-cerebral hemorrhage; determining the region of interest which corresponds to the contour of brain based on the higher scale level image; performing an unsupervised classification on the image in the region of interest of the X-ray CT image of the head; and recognizing the intra-cerebral hemorrhage lesion by means of an expert system from the result of the unsupervised classification.

Further objects and advantages of the present invention will be apparent from the following description of the preferred embodiments of the invention as illustrated in the accompanying drawings.

DETAILED DESCRIPTION OF THE INVENTION

Figure 1:
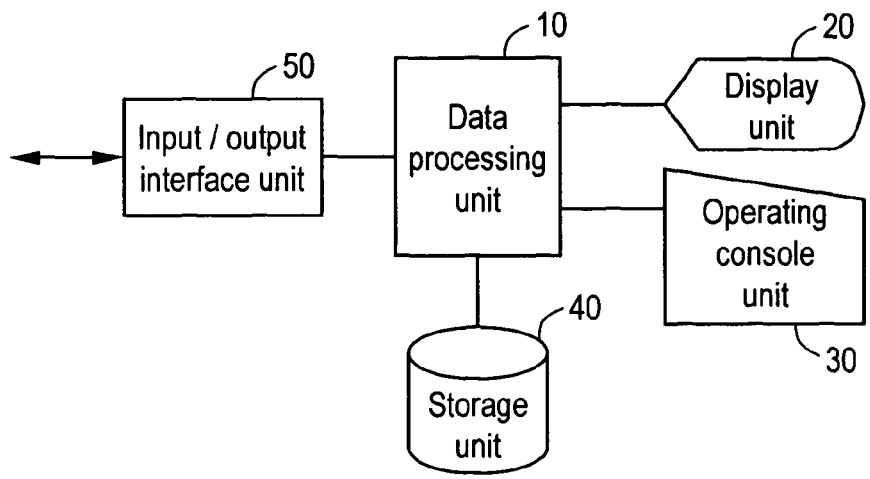
FIG. 1 shows, in the schematic block diagram form, the overview of an image processing apparatus.

The best mode for carrying out the invention will be described hereinbelow with reference to the accompanying drawings. It should be noted that the present invention should not be considered to be limited by the best mode for carrying out the invention. FIG. 1 shows, in the schematic block diagram form, the overview of an image processing apparatus.

The apparatus shown is an exemplary best mode for carrying out the invention. The arrangement of this apparatus shows an exemplary best mode for carrying out the inventive apparatus for intra-cerebral hemorrhage lesion segmentation. The operation of this apparatus shows an exemplary best mode for carrying out the inventive method for intra-cerebral hemorrhage lesion segmentation.

As shown in FIG. 1, the apparatus has a data processing unit 10, a display unit 20, an operating console unit 30, a storage unit 40, and an input/output interface unit 50.

The data processing unit 10 performs predetermined data processing on the data stored in the storage unit 40 in accordance with the interactive operation by the user through the display unit 20 and the operating console unit 30. The data processing unit 10 also performs data input and output to an external device through the input/output interface unit 50. The X-ray CT images to perform the intra-cerebral hemorrhage lesion segmentation are to be input from the external device through the input/output interface unit 50. The external device may be for example an X-ray CT apparatus or a medical image server and the like. The apparatus may be part of an X-ray CT imaging apparatus or a medical image server. In the latter case, the input/output interface unit 50 is not mandatory.

Figure 2:
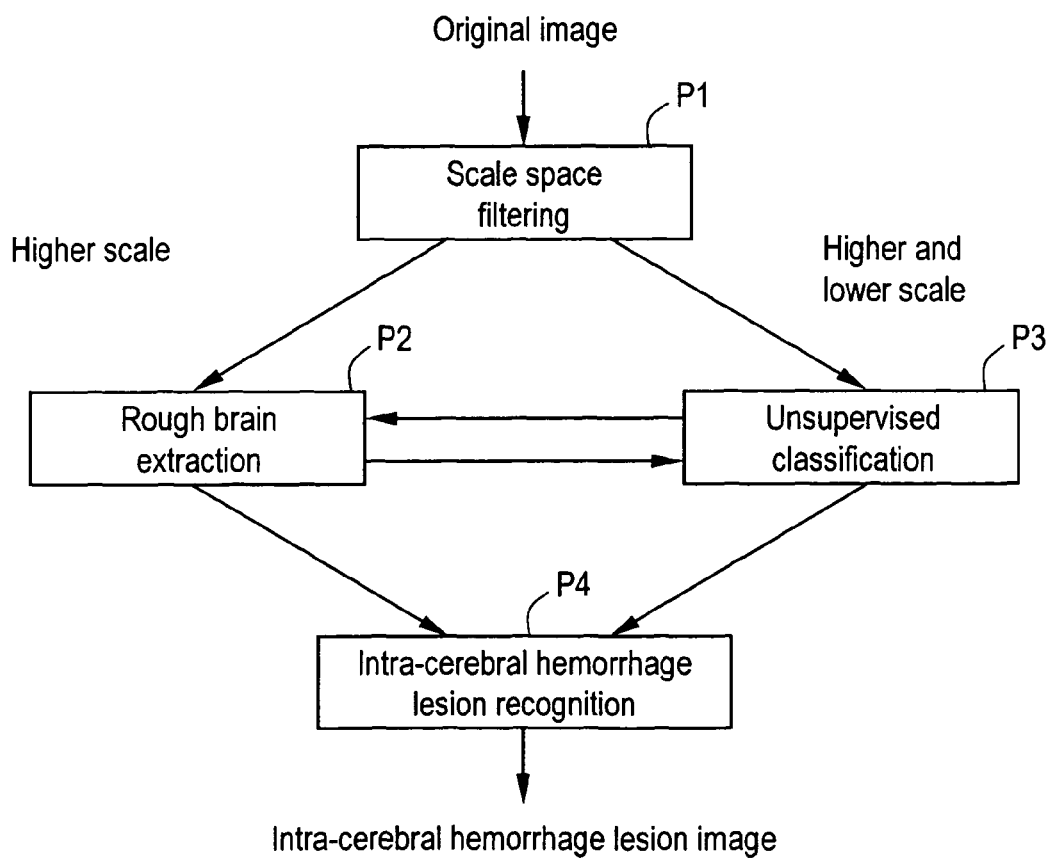
FIG. 2 shows the process for performing the intra-cerebral hemorrhage lesion segmentation.

The intra-cerebral hemorrhage lesion segmentation performed by the inventive apparatus will be described now. FIG. 2 shows the process for performing the intra-cerebral hemorrhage lesion segmentation. As shown in FIG. 2, the intra-cerebral hemorrhage lesion segmentation is performed as four processes P1, P2, P3 and P4.

In process P1, the scale space filtering is performed on the original CT ICH image of the head with the onset of intra-cerebral hemorrhage. The scale space filtering is done by the data processing unit 10. The data processing unit 10 is an example of the filtering means in accordance with the present invention.

The scale space filtering yields images of various scale spaces ranging from a lower scale level to a higher scale level. The scale space filtering will be described in greater details later.

In process P2, a rough brain extraction is performed based on the higher scale level image. The rough brain extraction is performed by the data processing unit 10. The data processing unit 10 is an example of the region of interest forming means in accordance with the present invention. The rough brain extraction will be described in greater details later.

In process P3, the unsupervised classification is performed based on the higher scale level image and the lower scale level image. The unsupervised classification is performed by the data processing unit 10. The data processing unit 10 is an example of the classification means in accordance with the present invention.

The unsupervised classification uses the result of rough brain extraction. The rough brain extraction uses the unsupervised classification. The unsupervised classification will be described in greater details later.

In process P4, ICH lesion recognition is conducted based on the result from the processes P2 and P3. The ICH lesion recognition is performed by the data processing unit 10. The data processing unit 10 is an exemplary recognition means in accordance with the present invention.

The scale space filtering (process P1) will be described. The scale space filtering uses a filter given by for example the following equation.

$$\frac{\partial}{\partial t} y(i, t) = div(c(i, t)\nabla y(i, t)) = c(i, t)\Delta y(i, t) + \nabla c \cdot \nabla y(i, t) \quad \text{[equation 1]}$$

Figure 3:
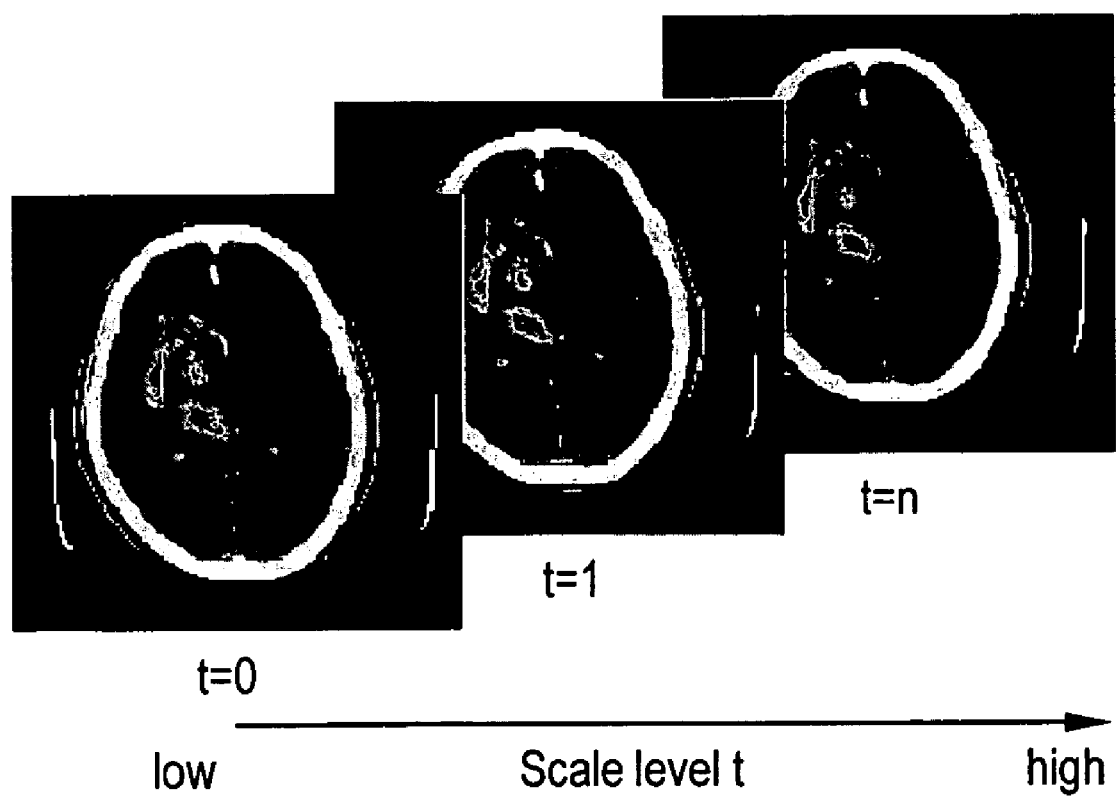
FIG. 3 shows a scale level image.

This equation indicates an anisotropic diffusion filter. Use of such filter may yield an image where the scale level t gradually increases as shown in FIG. 3, namely the scale level image. The images of which the value of scale level t is smaller designate to the lower scale level images, while the image of which the value of scale level t is larger designate to the higher scale level images.

Although noise decreases when the scale level of image is higher, the anisotropic diffusion filter allows edges of image to be held in good condition throughout entire scale level range.

Figure 4:
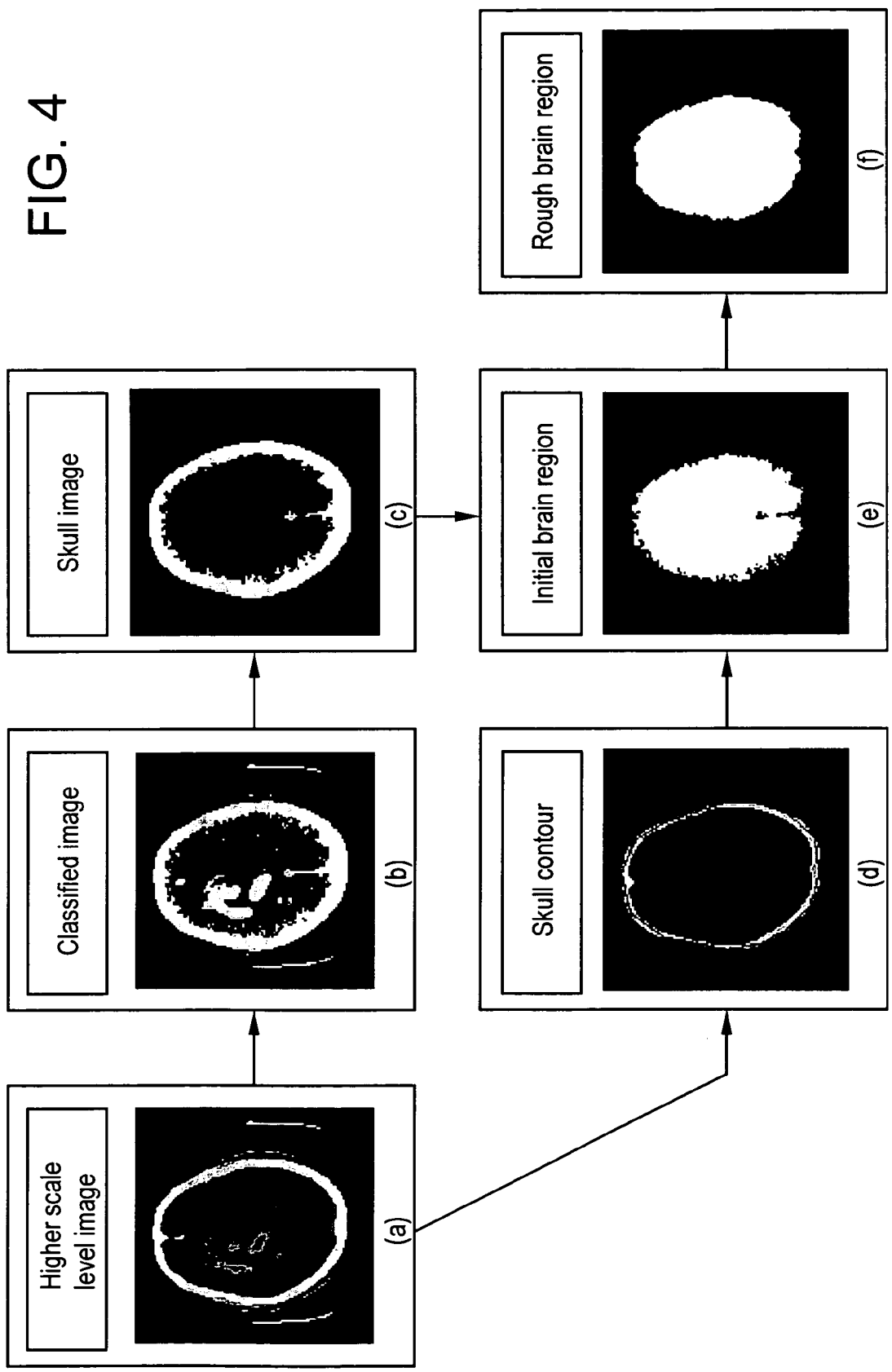
FIG. 4 shows the concept of rough brain extraction.

Now the rough brain extraction (process P2) will be described in greater details. FIG. 4 shows the concept of rough brain extraction. The rough brain extraction is performed on the higher scale level image (a). First, a classified image (b) is obtained by the unsupervised classification. The classified image (b) is a binary-level image in which the region of the CT value higher than a predetermined threshold is at high brightness (white). In this image the cranial bones, intra-cerebral hemorrhage lesion, and head retainer instruments are drawn at high brightness.

Skull image (c) is extracted from the classified image (b). The extraction of the skull image (c) is done by the threshold segmentation. The threshold segmentation uses the threshold corresponding to the CT value of bones.

On the other hand, the skull contour (d) is determined from the higher scale level image (a). The skull contour (d) can be obtained by using the active contour method or the live wire method and the like.

The region corresponding to the skull image (c) is deleted from the region surrounded by the skull contour (d). This yields the remaining region as initial brain region (e).

Morphological operation is applied to the initial brain region (e) to form the rough brain region (f). The morphological operation may be done for example by dilation, filling, and eroding.

The rough brain region (f) indicates the region inside the cranial bones. The rough brain region (f) includes neither the skull bone image nor skull retaining instrumentation image. Therefore, this region can be used as the region of interest (ROI) to eliminate the influence of the CT values of skull bones and skull retaining instrumentation. In addition the influence of partial volume effect in the brain area in proximity to the cranial bones.

Figure 5:
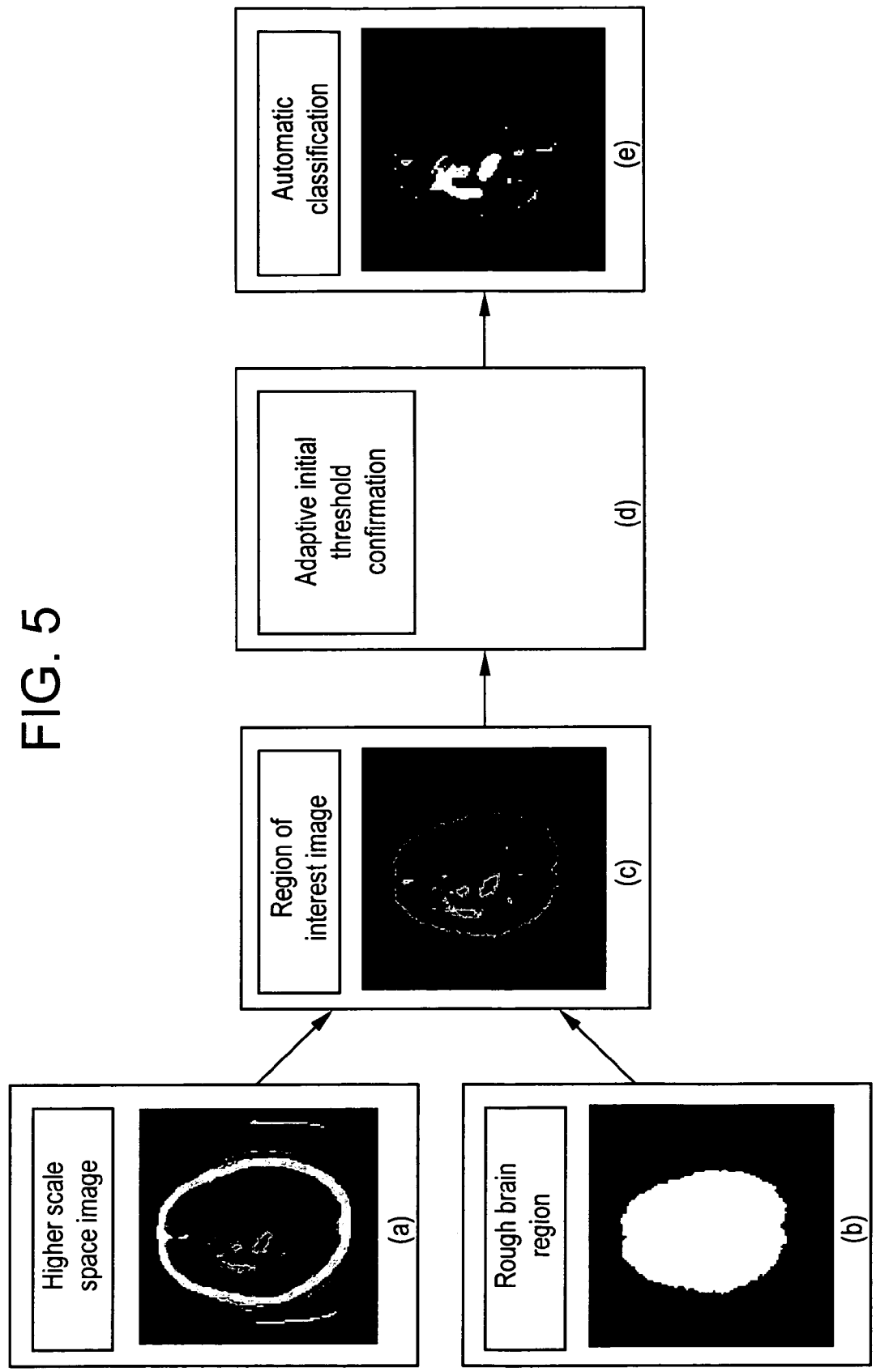
FIG. 5 shows the concept of the unsupervised classification.

The unsupervised classification (process P3) will be described in greater details. FIG. 5 shows the concept of the unsupervised classification. In the unsupervised classification, the region of interest image (c) that corresponds to the rough brain region (b) is extracted from the higher scale level image (a), to which image the adaptive initial threshold confirmation (d) is applied. Then by using the result thereof, the automatic classification (e) is applied to determine the candidate image of intra-cerebral hemorrhage lesion.

Figure 6:
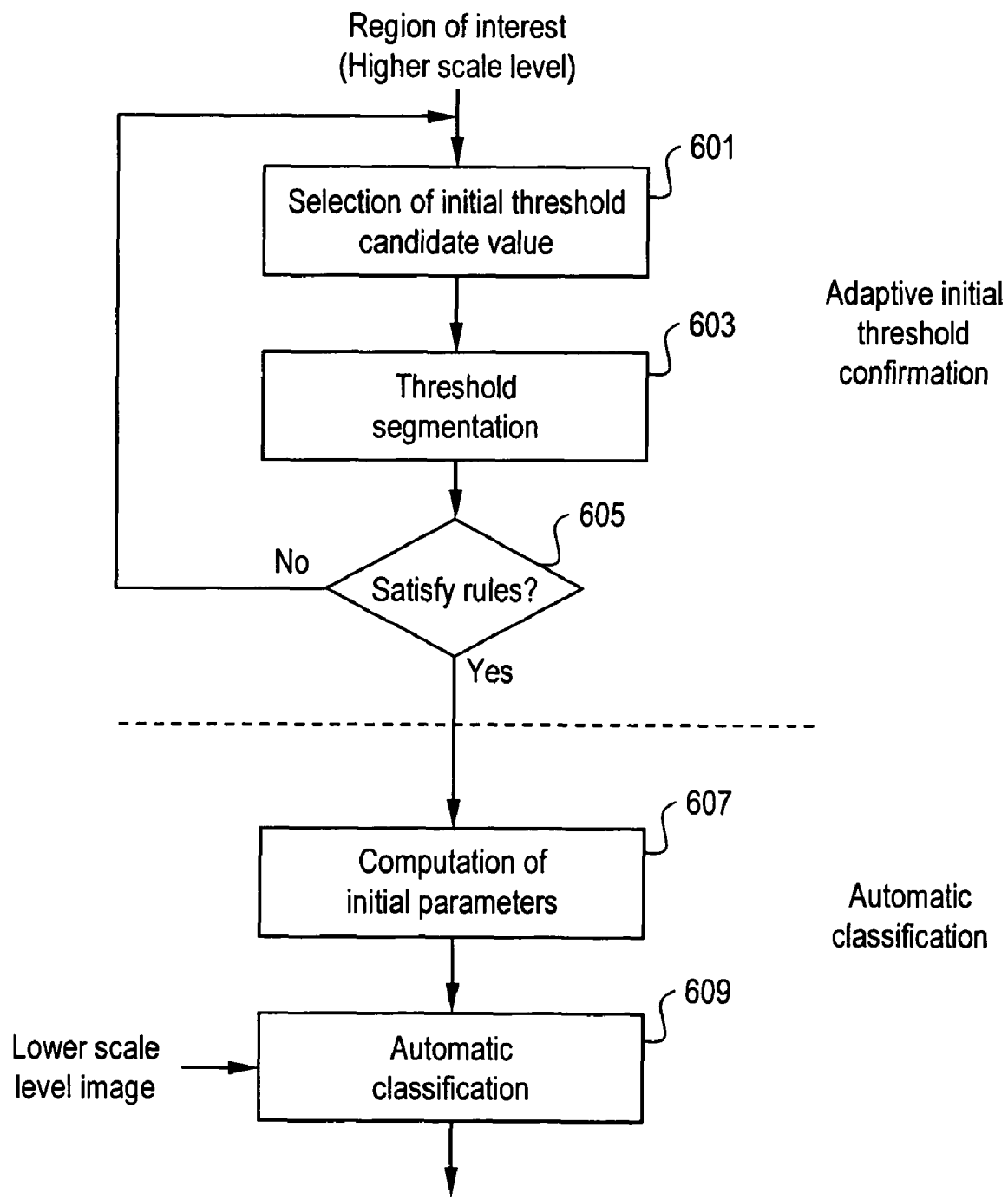
FIG. 6 shows a flow diagram of adaptive initial threshold confirmation and automatic classification.

FIG. 6 shows a flow diagram of adaptive initial threshold confirmation and automatic classification. For the adaptive initial threshold confirmation, one of a plurality of initial threshold candidates predefined is selected in step 601, the threshold segmentation by that initial threshold candidate is performed in step 603, and the result of threshold segmentation is determined whether or not to satisfy the predefined rules in step 605. The rules for determination may be whether or not the number of regions obtained by the threshold segmentation is fallen within a predetermined maximum number.

The operation in steps 601 to 605 will be repeatedly iterated until the initial threshold that satisfies the rules will be obtained. By this, the optimum initial threshold will be determined ultimately.

For the automatic classification, the initial parameters are computed in step 607, and then automatic classification is performed in step 609. The initial parameters computed in step 607 includes for example threshold value, mean value, standard deviation, etc. The automatic classification of step 609 is performed using such initial parameters. The automatic classification is applied to the region of interest of the lower scale level image. The region of interest is the region corresponding to the rough brain region.

The automatic classification is performed for example with the threshold segmentation. Alternatively, it can be performed with the MAP segmentation (maximization a prior segmentation) or FCM clustering (fuzzy C means clustering). The automatic classification can be done using any of other appropriate methods.

Figure 7:
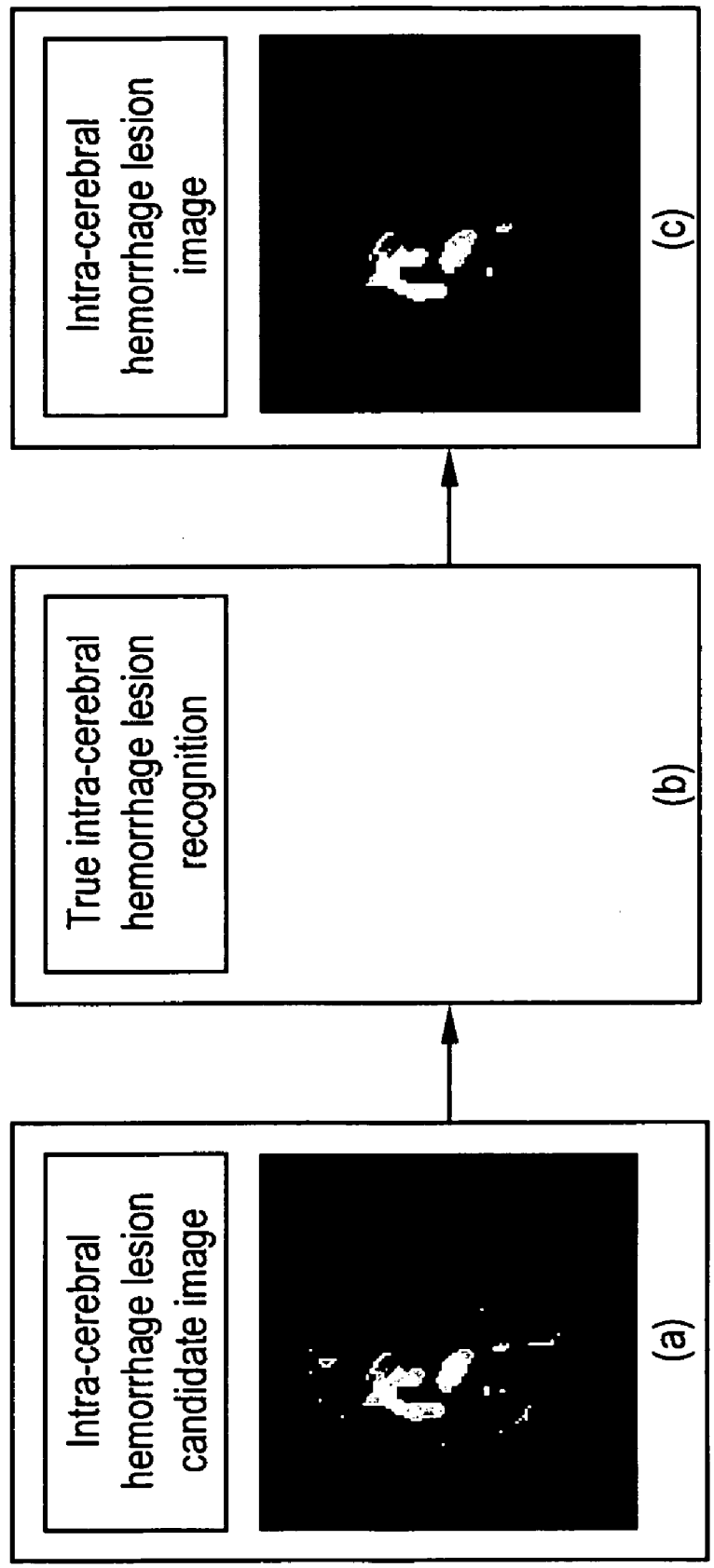
FIG. 7 shows the concept of the intra-cerebral hemorrhage lesion recognition.

Now the intra-cerebral hemorrhage lesion recognition (process P4) will be described in greater details. FIG. 7 shows the concept of the intra-cerebral hemorrhage lesion recognition. The intra-cerebral hemorrhage lesion recognition is performed by an expert system.

The expert system performs the true intra-cerebral hemorrhage lesion recognition (b) on the candidate images of intra-cerebral hemorrhage (a) to determine the intra-cerebral hemorrhage lesion image (c). The true intra-cerebral hemorrhage lesion recognition (b) is performed according to the predefined rules.

The rules used for the recognition may include as follows:

1) Exclude the region with mean CT value higher than a predetermined value (for example, 100) due to higher probability that it is a bone.

2) Exclude the region with mean CT value less than a predetermined value (for example, initial threshold) due to higher probability that it is normal brain tissue.

3) Exclude the region with the number of pixels less than a predetermined value (for example, 30) due to higher probability that it is a calcified region.

4) Exclude the region having its center excessively close to the edge of rough brain region due to the higher probability that it is a normal region affected by the partial volume effect.

Some display examples of intra-cerebral hemorrhage lesion segmentation result are shown in FIGS. 10 to 15. An original image is shown in left-hand side, and an image with the intra-cerebral hemorrhage lesion segmentation result superposed thereon is shown in right-hand side. The intra-cerebral hemorrhage lesion segmentation result is displayed in red, however is illustrated in black and white in drawings.

Figure 10:
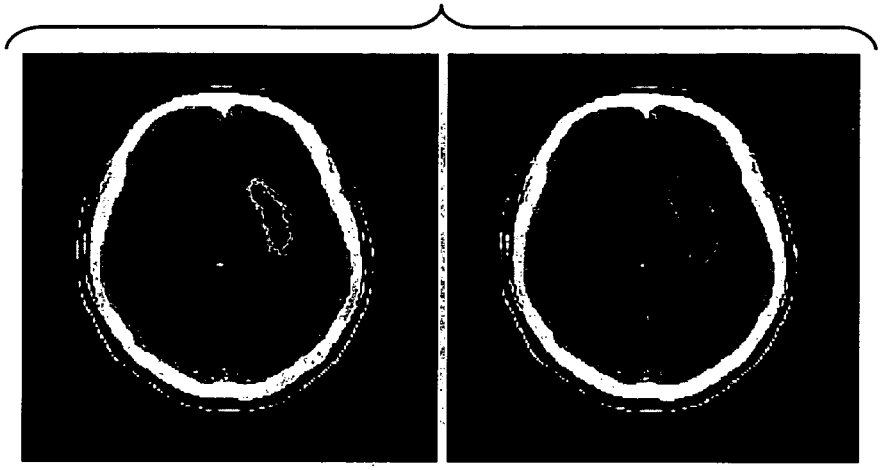
FIG. 10 shows a gradation photograph illustrative of an exemplary intra-cerebral hemorrhage lesion segmentation result.
Figure 11:
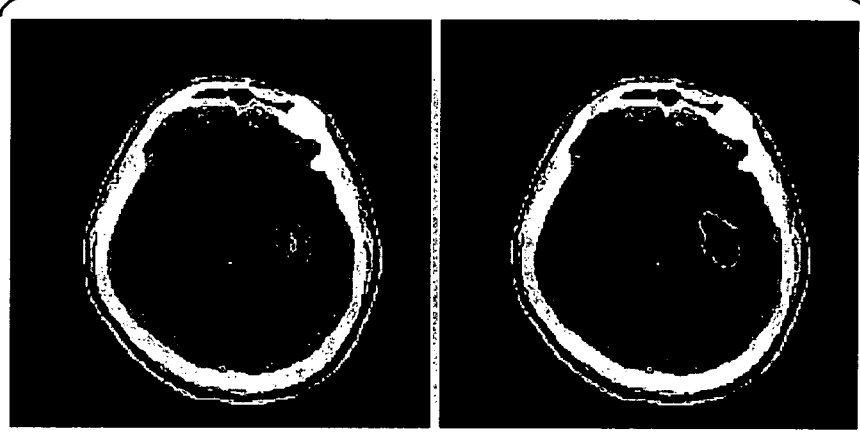
FIG. 11 shows a gradation photograph illustrative of an exemplary intra-cerebral hemorrhage lesion segmentation result.

FIG. 10 shows an example of high contrast lesion; FIG. 11 shows a low contrast lesion. Both examples are properly segmented.

Figure 12:
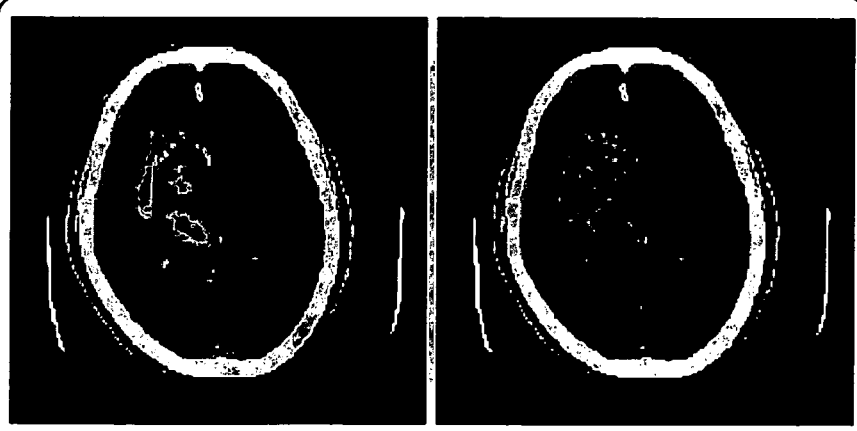
FIG. 12 shows a gradation photograph illustrative of an exemplary intra-cerebral hemorrhage lesion segmentation result.
Figure 13:
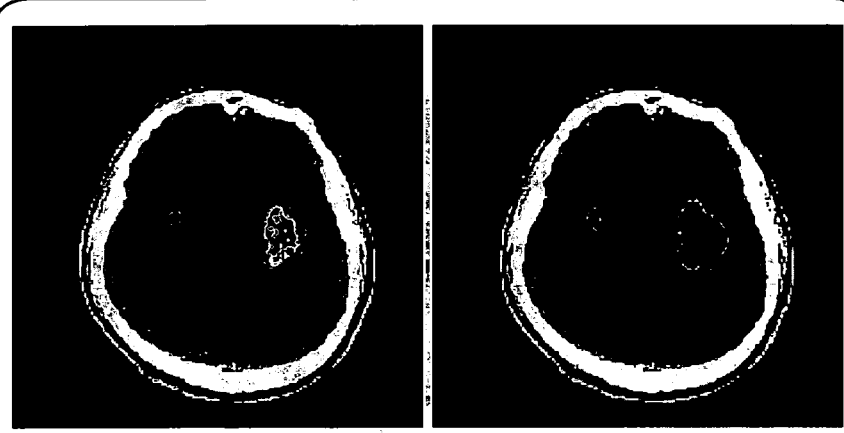
FIG. 13 shows a gradation photograph illustrative of an exemplary intra-cerebral hemorrhage lesion segmentation result.
Figure 14:
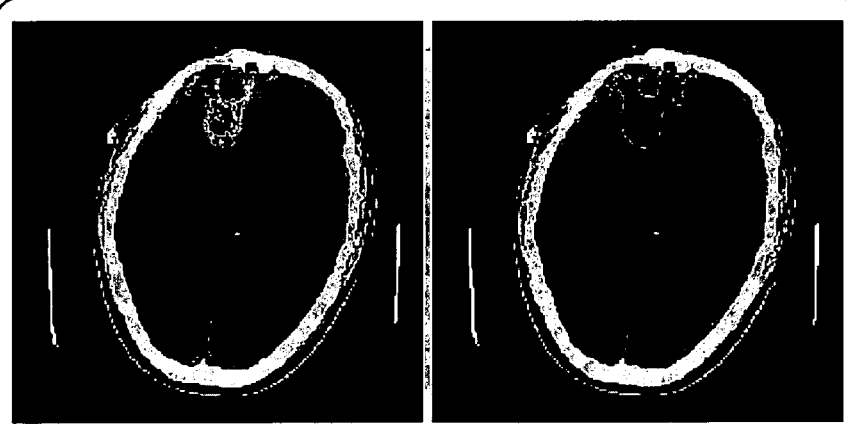
FIG. 14 shows a gradation photograph illustrative of an exemplary intra-cerebral hemorrhage lesion segmentation result.
Figure 15:
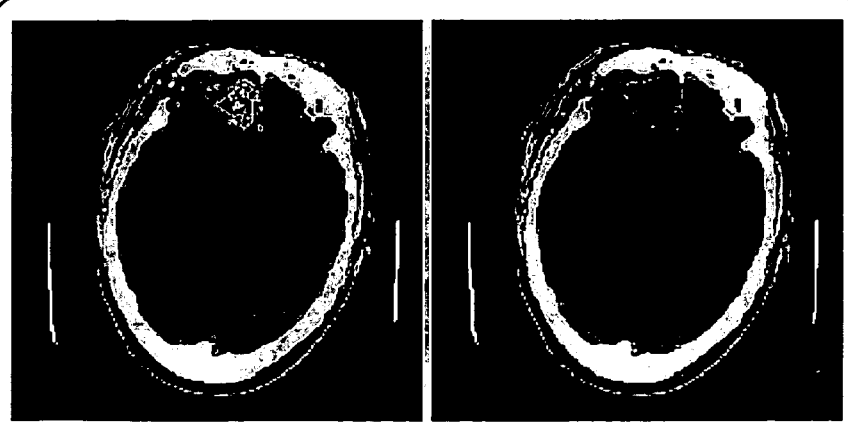
FIG. 15 shows a gradation photograph illustrative of an exemplary intra-cerebral hemorrhage lesion segmentation result.

FIGS. 12 and 13 show examples of plural lesions. Both examples are properly segmented. FIGS. 14 and 15 show examples with lesion in proximity to the cranial bone. Although FIG. 15 shows an example with the cranial bones not completely closed, the lesion is properly segmented even in that case.

Figure 8:
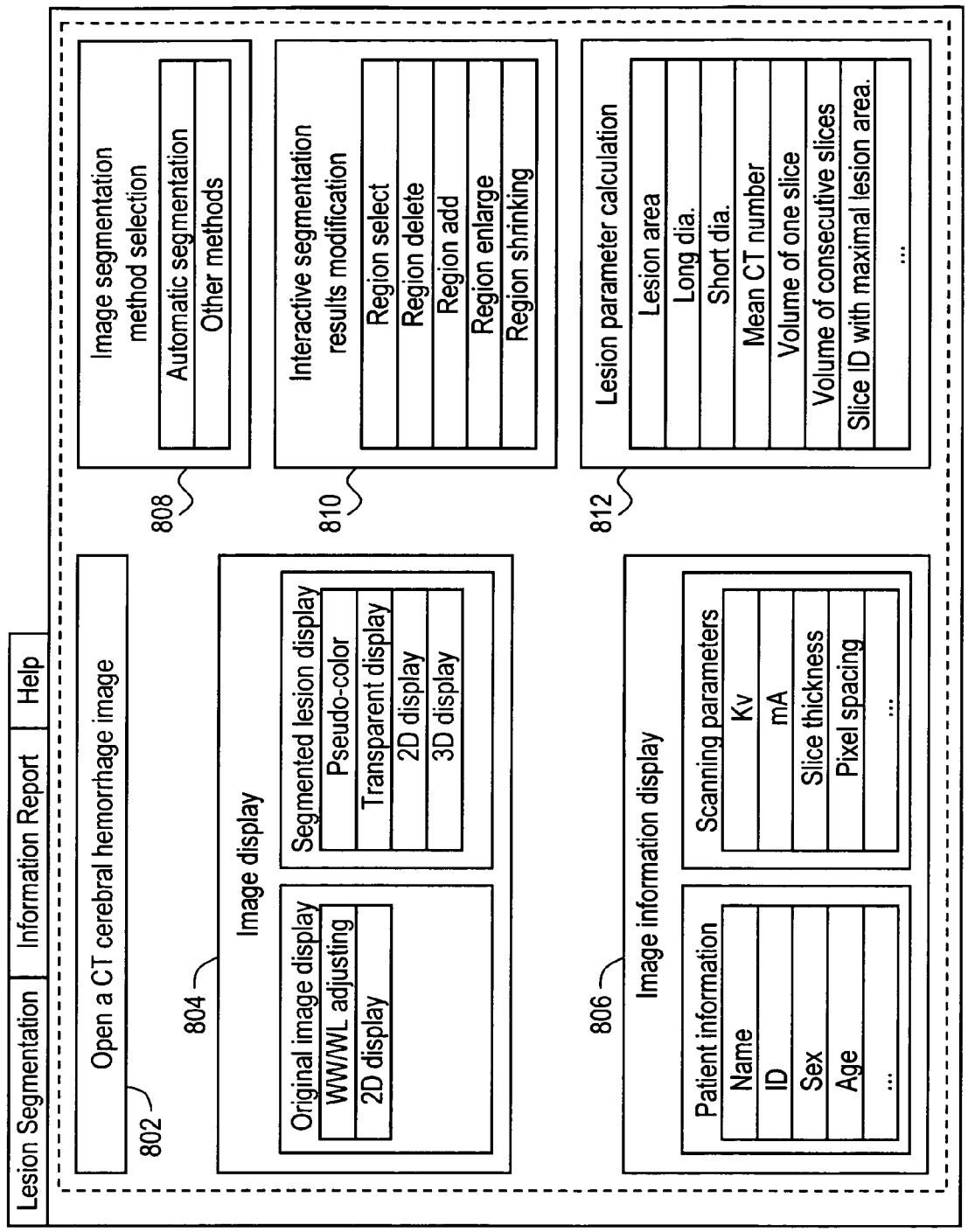
FIG. 8 shows an example of user interface.

An exemplary user interface is shown in FIG. 8 used for the intra-cerebral hemorrhage lesion segmentation as have been described above. The user interface may be a graphical user interface shown in the display unit 20 and operated by such a pointing device as a mouse and a touch panel.

The user interface includes a GUI 802 for image retrieving, a GUI 804 for image displaying, a GUI 806 for displaying information associated with the displayed image, a GUI 808 for segmentation method selection, a GUI 810 for interactive operation of segmentation result, and a GUI 812 for computing parameters of intra-cerebral hemorrhage lesion.

The GUI 804 for image displaying, the GUI 806 for displaying information associated with the displayed image, the GUI 808 for segmentation method selection, the GUI 810 for interactive operation of segmentation result, and the GUI 812 for computing parameters of intra-cerebral hemorrhage lesion are organized of a set of a plurality of GUIs.

The GUI 804 for image displaying is comprised of a GUI for enabling the adjustment of window width (WW) and window level (WL) of the original image, a GUI for enabling 2D displaying, a GUI for enabling a pseudo-color display of segmented lesion image, a GUI for enabling transparent display, a GUI for enabling 2D display, and a GUI for enabling 3D display.

The GUI 806 for displaying information associated with image is comprised of a GUI for enabling display of patient information such as name, ID, gender, age and the like, and a GUI for enabling display of scan parameters including for example KV, mA, slice thickness, pixel spacing and the like.

The GUI 808 for segmentation method selection is comprised of a GUI for enabling automatic segmentation, and a GUI for enabling the segmentation of other methods.

The GUI 810 for interactive operation of segmentation result is comprised of a set of GUIs each enabling the region selection, region deletion, region addition, region expansion, region shrinkage and the like.

The GUI 812 for parameter computation of intra-cerebral hemorrhage lesion is comprised of a set of GUIs each enabling the computation of lesion area, major axis of lesion, minor axis of lesion, maximum CT value, one slice volume, and continuous plural slice volume, and a GUI for displaying the slice ID of the slice in which the lesion has the largest surface area.

Figure 9:
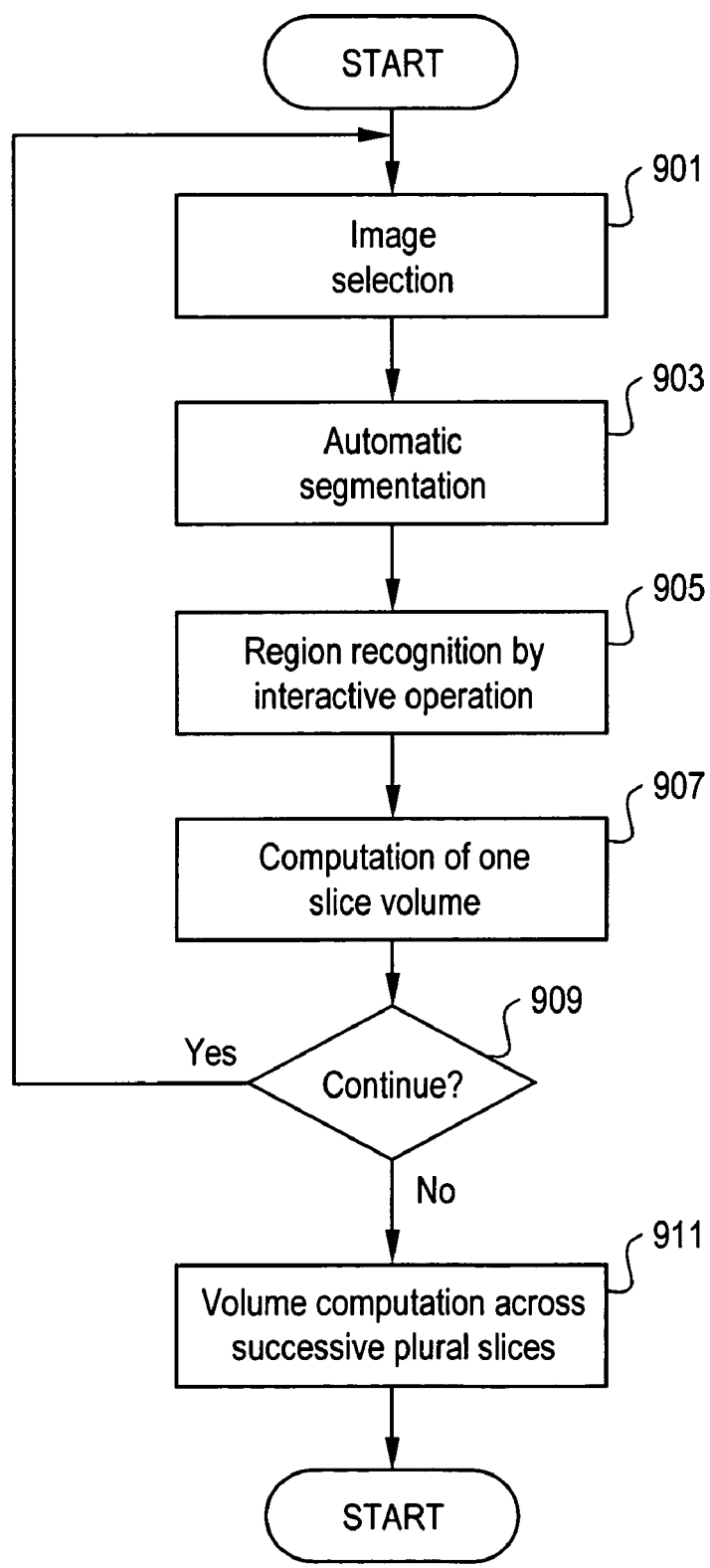
FIG. 9 shows a flow diagram of the operation of an image processing apparatus of one example of a preferred embodiment for carrying out the invention.

A flow diagram of the operation of the apparatus by the operation via the user interface as mentioned above is shown in FIG. 9. An image is selected in step 901. The GUI 802 is used for image selection. The automatic segmentation is performed in step 903. The automatic segmentation is performed by the operation of the GUI 808.

The region confirmation by the interactive operation is conducted in step 905. The region confirmation by the interactive operation is performed by the operation of the GUI 810 for the intra-cerebral hemorrhage lesion image displayed by the operation of the GUI 804.

The volume calculation of one slice is performed in step 907. The volume calculation is performed by the operation of the GUI 812.

It is determined whether to continue the current work or not in step 909. When the work is to be continued, the operation of the steps 901 to 909 is repeatedly iterated. By doing this, the automatic segmentation, interactive region confirmation, one slice volume calculation are performed for each of successive plural slice images.

When all of desired images are processed, the lesion volume through successive plural slices is determined in step 911. This computation is performed by the operation of the GUI 812.

Many widely different embodiments of the invention may be constructed without departing from the spirit and the scope of the present invention. It should be understood that the present invention is not limited to the specific embodiments described in the specification, except as defined in the appended claims.

The invention claimed is:

1. A method of intra-cerebral hemorrhage lesion segmentation comprising the steps of:
   - obtaining images of various scale spaces ranging from a lower scale level to a higher scale level by means of a scale space filtering on an X-ray computed tomography (CT) image of a head with an onset of an intra-cerebral hemorrhage;
   - determining a region of interest which corresponds to a contour of a brain based on a higher scale level image obtained at the higher scale level;
   - performing an unsupervised classification based on the higher scale level image and a lower scale level image obtained at the lower scale level; and
   - recognizing an intra-cerebral hemorrhage lesion by means of an expert system from a result of the unsupervised classification.

2. The method of intra-cerebral hemorrhage lesion segmentation according to claim 1, wherein the scale space filtering is performed by an unanisotropic diffusion filtering.

3. The method of intra-cerebral hemorrhage lesion segmentation according to claim 1, wherein the region of interest is determined by:
   - a skull contour extraction for the higher scale level image;
   - an unsupervised classification of the higher scale level image;
   - a threshold segmentation of the result of the unsupervised classification;
   - a skull image extraction from a result of the threshold segmentation;
   - an elimination of a region corresponding to the skull image from a region surrounded by the skull contour; and
   - a morphological operation on a remaining region.

4. The method of intra-cerebral hemorrhage lesion segmentation according to claim 1, wherein the unsupervised classification is performed by:
   - an adaptive initial threshold confirmation on an image within the region of interest of the higher scale level image; and
   - an automatic classification of the image within a region of interest of a skull X-ray CT image based on an initial threshold determined by the adaptive initial threshold confirmation.

5. The method of intra-cerebral hemorrhage lesion segmentation according to claim 4, wherein the adaptive initial threshold confirmation is performed by a determination on a result of a threshold segmentation based on a plurality of initial threshold candidates predefined.

6. The method of intra-cerebral hemorrhage lesion segmentation according to claim 4, wherein the automatic classification is performed by:
   - a computation of initial parameters by using the initial threshold determined by the adaptive initial threshold confirmation; and
   - the automatic classification of the image within the region of interest of the skull X-ray CT image by using the initial parameters.

7. The method of intra-cerebral hemorrhage lesion segmentation according to claim 6, wherein the automatic classification is performed by a threshold segmentation.

8. The method of intra-cerebral hemorrhage lesion segmentation according to claim 6, wherein the automatic classification is performed by a maximization a prior segmentation.

9. The method of intra-cerebral hemorrhage lesion segmentation according to claim 6, wherein the automatic classification is performed by fuzzy C means clustering.

10. An apparatus for intra-cerebral hemorrhage lesion segmentation comprising:
    - a filtering means for obtaining images of various scale spaces ranging from a lower scale level to a higher scale level by means of a scale space filtering on an X-ray computed tomography (CT) image of a head with an onset of an intra-cerebral hemorrhage;
    - a region of interest formation means for determining a region of interest that corresponds to a contour of a brain based on a higher scale level image obtained at the higher scale level;
    - a classification means for performing an unsupervised classification based on said higher scale level image and a lower scale level image obtained at the lower scale level; and
    - a recognition means for recognizing an intra-cerebral hemorrhage lesion by means of an expert system from the result of the unsupervised classification.

11. The apparatus for intra-cerebral hemorrhage lesion segmentation according to claim 10, wherein the scale space filtering is performed by an unanisotropic diffusion filtering.

12. The apparatus for intra-cerebral hemorrhage lesion segmentation according to claim 10, wherein the region of interest is determined by:
    - a skull contour extraction for the higher scale level image;

an unsupervised classification of the higher scale level image;

a threshold segmentation of the result of the unsupervised classification;

a skull image extraction from a result of the threshold segmentation;

an elimination of a region corresponding to the skull image from a region surrounded by the skull contour; and a morphological operation on the remaining region in order to properly form the region of interest.

13. The apparatus for intra-cerebral hemorrhage lesion segmentation according to claim 10, wherein the unsupervised classification is performed by:

an adaptive initial threshold confirmation on an image within a region of interest of the higher scale level image; and an automatic classification of the image within the region of interest of a skull X-ray CT image based on an initial threshold determined by the adaptive initial threshold confirmation.

14. The apparatus for intra-cerebral hemorrhage lesion segmentation according to claim 13, wherein the adaptive initial threshold confirmation is performed by:

a determination on a result of a threshold segmentation based on a plurality of initial threshold candidates predefined.

15. The apparatus for intra-cerebral hemorrhage lesion segmentation according to claim 13, wherein said automatic classification is performed by:

a computation of initial parameters by using the initial threshold determined by the adaptive initial threshold confirmation; and the automatic classification of the image within the region of interest of the skull X-ray CT image by using the initial parameters.

16. The apparatus for intra-cerebral hemorrhage lesion segmentation according to claim 15, wherein automatic classification is performed by a threshold segmentation.

17. The apparatus for intra-cerebral hemorrhage lesion segmentation according to claim 15, wherein said automatic classification is performed by a maximization a prior segmentation.

18. The apparatus for intra-cerebral hemorrhage lesion segmentation according to claim 15, wherein automatic classification is performed by a fuzzy C means clustering.

19. The apparatus for intra-cerebral hemorrhage lesion segmentation according to claim 10, further comprisinga a user interface for enabling a retrieval of images, a display of images, a display of information associated with the displayed image, a selection of segmentation method, an interactive manipulation of segmentation result, and a computation of intracerebral hemorrhage parameters.

20. The apparatus for intra-cerebral hemorrhage lesion segmentation according to claim 19, wherein said user interface is a graphical user interface.

* * * * *